United States Patent [19]

Stengel

[11] 4,387,014
[45] Jun. 7, 1983

[54] ELECTROCHEMICAL METAL PROCESSING APPARATUS

[75] Inventor: Edgar Stengel, Remscheid, Fed. Rep. of Germany

[73] Assignee: AEG-Elotherm G.m.b.H., Remscheid-Hasten, Fed. Rep. of Germany

[21] Appl. No.: 318,199

[22] Filed: Nov. 4, 1981

[30] Foreign Application Priority Data

Dec. 6, 1980 [DE] Fed. Rep. of Germany ........ 3046091

[51] Int. Cl.³ .......................... B23P 1/12; B23Q 3/18; B23K 9/16; B24B 41/06
[52] U.S. Cl. ............................... 204/212; 204/224 R; 204/224 M; 204/225; 204/297 R; 269/61; 51/237 R; 51/216 T; 51/240 T; 219/69 E
[58] Field of Search ............... 204/297 R, 225, 224 R, 204/224 M, 199, 212; 269/57, 61, 82; 219/158, 219/159, 161, 69 R, 69 E; 51/216 R, 216 ND, 216 H, 51/216 T, 236, 237 R, 240 T

[56] References Cited

U.S. PATENT DOCUMENTS

| | | | |
|---|---|---|---|
| 3,106,110 | 10/1963 | Senn | 269/82 |
| 3,272,732 | 9/1966 | Faulkner | 204/297 R |
| 3,461,059 | 8/1969 | Krueger | 204/297 R |
| 3,573,188 | 3/1971 | Williams et al. | 204/212 |
| 3,664,947 | 5/1972 | Bass | 204/297 R |
| 3,860,399 | 1/1975 | Noble et al. | 51/216 T X |

FOREIGN PATENT DOCUMENTS

2,032,309 12/1979 Fed. Rep. of Germany
2.329.671 7/1975 Fed. Rep. of Germany

*Primary Examiner*—Donald R. Valentine
*Attorney, Agent, or Firm*—Cushman, Darby & Cushman

[57] ABSTRACT

An electrochemical apparatus with a table formed by three slabs on which the workpiece rests. The table is mounted for rotation about a vertical axis and rests on a fixed support. A plurality of rollers in recesses of the fixed support engage the undersurface of the lower slab, and can be raised by servomotors to rotate the table. A clamping arrangement also engages the lower slab and fixed support for clamping the table in any desired orientation.

9 Claims, 1 Drawing Figure

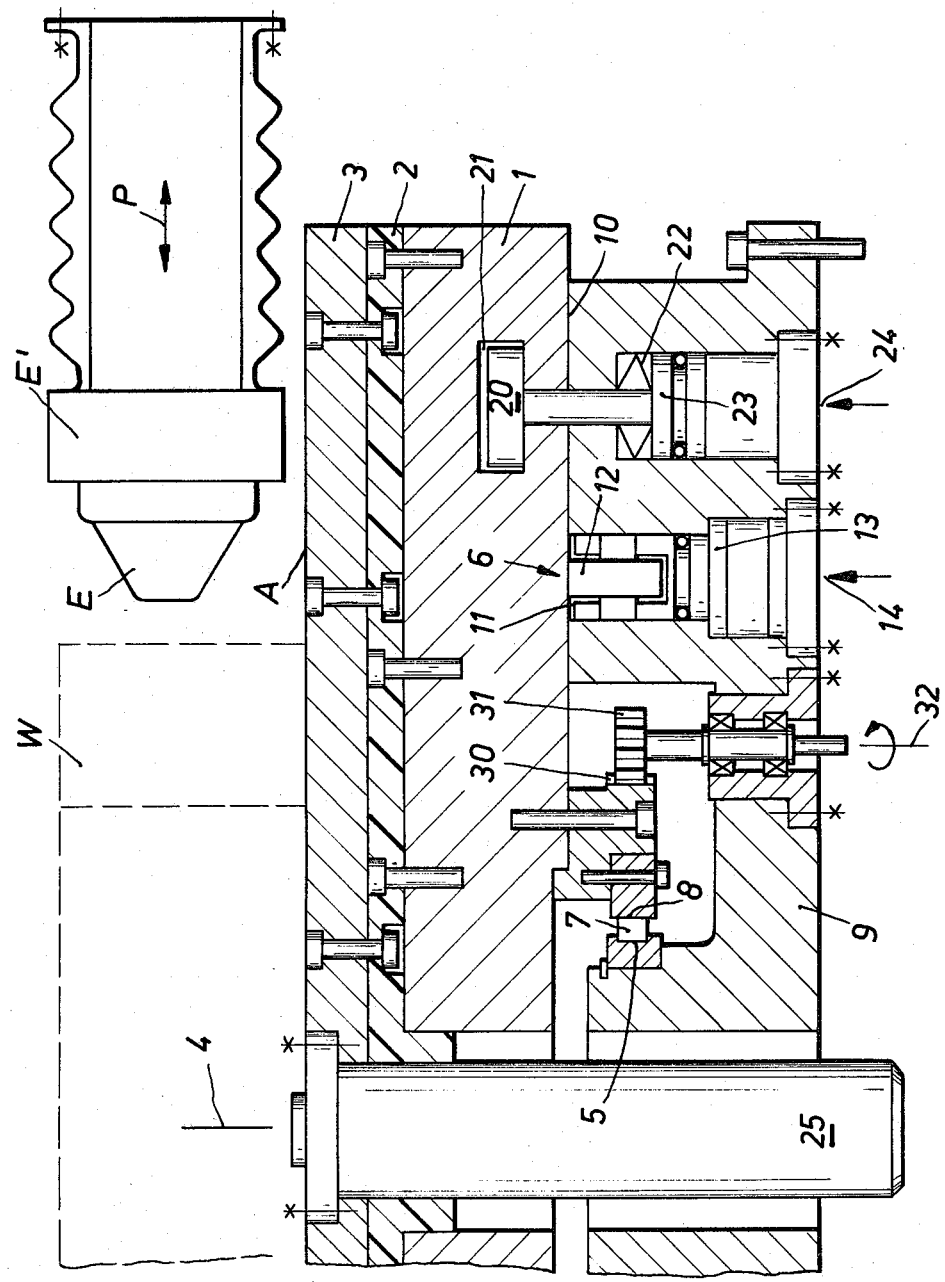

ELECTROCHEMICAL METAL PROCESSING APPARATUS

The invention relates to an apparatus for the electrochemical processing of metal.

A typical apparatus of this type is equipped with an antifriction bearing defining the table axis, which bearing absorbs both radial as well as axial forces. A roller bearing absorbs the table load and is aligned vertically with the antifriction bearing. The device usually has a central recess located on the rotational axis through which an electric conductor extends to connect the tabletop with an electric power source. The antifriction and roller bearings are electrically insulated from each other and the tabletop is insulated electrically from the rotational axis. A clamping arrangement engages the table for locking the table in predetermined angular positions.

This known apparatus must contact warm, electrolytic fluid, and has the disadvantage that the clamping forces necessary for clamping down the tabletop must be transmitted by way of the roller or antifriction bearings and relatively little clearance is available. Therefore, the necessary clamping parts must be small and the assigned clamping elements are subject to deformation by contact with the warm electrolyte, such deformation leading to jamming of the table.

According to the present invention, the clamping of the round table is free of any influence from thermal effects of the warm electrolyte. Furthermore, the clamping takes place without transmission of mechanical forces through the pertinent bearings.

The attached drawing shows, as an embodiment by way of example, a sectional view through the axis of rotation of an apparatus according to the invention. In the drawing, the letter "E" designates a conventional metallic processing electrode which is disposed in a mounting E'. The mounting E' is mounted for movement in the direction of arrow P by a servomotor (not shown) and is, in the customary manner, adjustable in relation to a workpiece W. The workpiece W is mounted by a clamp (not shown) on a workpiece holder A.

The processing electrode E is lowered in the customary manner, and with interposition of a liquid electrolyte, electrolytically into the surface of the workpiece W. For this purpose, the processing electrode E and the workpiece holder A are switched as an anode or cathode into the circuit of an electric DC current circuit, so that metal can be stripped electrolytically from the surface of the workpiece W.

A tabletop slab 1 made from cast iron supports a slab 2 made from plastic of corresponding size serving as an insulator and a slab 3 made from a noble metal. The slabs 1, 2 and 3 are interconnected in the manner of a sandwich by screws as shown and are mounted around a rotary axis 4 by an antifriction bearing 5 and several roller bearings 6.

The antifriction bearing parts 7 have the shape of a cylinder, are mounted in a guide defining axis 4, and are coupled by the guide to a locally fixed bearing part 9. Opposite antifriction bearing part 7 is a flat, annular surface 8 of an element attached to slabs 1, 2, and 3.

Slab 1 lies on a flat supporting surface 10 of locally fixed bearing part 9, and may be lifted from bearing part 9 in the direction of the rotational axis 4, whereby surface 8 shifts in relation to the antifriction bearing part 7.

Supporting surface 10 has recesses 11 distributed around rotational axis 4 at predetermined angular separations. In recesses 11, rollers 12 are rotatably mounted around a rotational axis aligned radially to rotational axle 4. The rollers 12 may be raised by means of hydraulic servomotors 13 by supplying oil pressure via oil supply opening 14 above the plane of the supporting surface 10, as a result of which slabs 1, 2, and 3 are raised in a direction parallel to the rotational axis and lifted off the supporting surface 10. Slabs 1, 2, and 3 are then easily rotatable around axis 4 on rollers 12.

In order to clamp the slabs 1, 2, and 3 on supporting surface 10, a plurality of clamping elements 20 are mounted in angular separation in an annular groove 21 about axis 4 for pulling slab 1 firmly against surface 10. Plate spring 22 applies a force to elements 20 to pull slabs 1, 2 and 3 down, which force may be compensated by the supply of an oil pressure through oil supply opening 24 to servomotors 23.

A copper bolt-like member 25 is in electrically conductive connection with slab 3 and consists of special steel. Member 25 is otherwise electrically insulated from the other elements of the apparatus and serves for the supply of the electric processing current to slab 3, for example, of a strength of current of 10,000 A.

Slab 1 has also been provided with a tooth gear 30 which encompasses axis 4 concentrically and is disposed concentrically in relation to bearing 5. Slabs 1, 2, and 3 may be rotated by gear 30 and pinion 31 which rotates about axis 32. For this purpose, slabs 1, 2, and 3 are raised as decribed above and rotated. The rollers 12 are then lowered and slabs 1, 2 and 3, clamped down.

Many changes and modifications can of course be carried out without departing from the scope of the present invention, that scope intended to be limited only by the scope of the appended claims.

What is claimed is:

1. Apparatus for the electrochemial processing of a metal workpiece by movement of an electrode into the surface of said workpiece comprising:
    a table formed as a sandwich of three slabs, the middle slab being electrically insulating and the slab on which the workpiece rests being electrically conductive;
    means for mounting said table for rotation about a vertical axis including a plurality of bearings;
    fixed means defining a support surface for supporting said table;
    means for raising said table above said surface including a plurality of rollers mounted for engaging said table and means for raising said rollers; and
    means for clamping said table to said fixed means.

2. Apparatus as in claim 1, wherein said raising means includes a servomotor for raising each of said rollers.

3. Apparatus as in claim 1, further including means for supplying electrical energy to said electrically conductive slab.

4. Apparatus as in claim 3, wherein said supplying means includes a member extending along the axis of rotation of said table.

5. Apparatus as in claim 1, further including means engaging said table for rotating said table about said vertical axis.

6. Apparatus for the electrochemical processing of a metal workpiece by movement of an electrode into the workpiece comprising:
    a rotatable table formed as a sandwich of an upper electrically conductive slab on which the workpiece rests, an intermediate electrically insulating slab and a lower slab;

means for mounting said table for rotation about a vertical axis including a plurality of bearings;

a fixed support having a supporting surface on which the lower surface of said lower slab rests;

a plurality of rollers, each disposed in a recess in said supporting surface and engaging said lower surface;

means for raising said rollers to raise said slabs above said support surface for rotation of said table; and clamping means engaging said lower slab and said fixed support for clamping said table to said fixed support.

7. Apparatus as in claim 6, wherein said raising means includes a servomotor.

8. Apparatus as in claim 1 or 6, wherein said clamping means includes a clamping element mounted in an annular groove in the surface of said table resting on said fixed support and engaging said table for applying thereto a downward clamping force and means mounted in said support surface for applying forces to said element.

9. Apparatus as in claim 8, wherein said force applying means includes a spring urging said element to clamp said table to said fixed means and a servomotor for compensating the force of said spring.

* * * * *